(12) United States Patent
Tong et al.

(10) Patent No.: US 11,757,154 B2
(45) Date of Patent: Sep. 12, 2023

(54) BATTERY APPARATUS AND ELECTRONIC DEVICE

(71) Applicant: Guangdong Mic-power New Energy Co., Ltd., Guangdong (CN)

(72) Inventors: Yan Tong, Guangdong (CN); Zhiyong Chen, Guangdong (CN)

(73) Assignee: GUANGDONG MIC-POWER NEW ENERGY CO., LTD., Guangdong (CN)

( * ) Notice: Subject to any disclaimer, the term of this patent is extended or adjusted under 35 U.S.C. 154(b) by 148 days.

(21) Appl. No.: 16/973,569

(22) PCT Filed: Jul. 10, 2019

(86) PCT No.: PCT/CN2019/095497
§ 371 (c)(1),
(2) Date: Dec. 9, 2020

(87) PCT Pub. No.: WO2020/155563
PCT Pub. Date: Aug. 6, 2020

(65) Prior Publication Data
US 2021/0249732 A1   Aug. 12, 2021

(30) Foreign Application Priority Data

Feb. 2, 2019   (CN) .......................... 201910107887.7
Feb. 2, 2019   (CN) .......................... 201920187952.7

(51) Int. Cl.
*H01M 50/383*   (2021.01)
*H01M 50/186*   (2021.01)
(Continued)

(52) U.S. Cl.
CPC ....... *H01M 50/383* (2021.01); *H01M 50/184* (2021.01); *H01M 50/186* (2021.01); *H01M 50/578* (2021.01)

(58) Field of Classification Search
CPC ........... H01M 10/0427; H01M 10/285; H01M 10/152; H01M 50/30; H01M 50/109;
(Continued)

(56) References Cited

U.S. PATENT DOCUMENTS

2003/0138693 A1*  7/2003  Suzuki .............. H01M 10/0568
                                                              429/332
2011/0117398 A1*  5/2011  Kang ................ H01M 50/3425
                                                              429/170
(Continued)

FOREIGN PATENT DOCUMENTS

CN   107425145 A      12/2017
CN   107425145 A1 *   12/2017   ........ H01M 10/0427
(Continued)

*Primary Examiner* — Niki Bakhtiari
*Assistant Examiner* — Bartholomew A Hornsby
(74) *Attorney, Agent, or Firm* — SALIWANCHIK, LLOYD & EISENSCHENK (57) ABSTRACT

Disclosed are a battery apparatus and an electronic device. The battery apparatus includes: a first shell including a first tubular side wall and a top cap; and a second shell including a second tubular side wall and a bottom cap, wherein a recessed structure is formed in at least part of a connection region between the second tubular side wall and the bottom cap; the first tubular side wall sleeves the second tubular side wall; an insulation sealing piece is arranged between the first tubular side wall and the second tubular side wall; a portion of the first tubular side wall close to its open end is bent towards the recessed structure along part of a circumference of the open end to form a partial crimped edge; and the partial crimped edge is clamped to the recessed structure.

9 Claims, 5 Drawing Sheets

(51) Int. Cl.
*H01M 50/578* (2021.01)
*H01M 50/184* (2021.01)

(58) Field of Classification Search
CPC ............. H01M 50/143; H01M 50/153; H01M 50/166; H01M 50/167; H01M 50/169; H01M 50/171; H01M 50/181; H01M 50/325; H01M 50/35; H01M 50/358; H01M 10/0436; H01M 10/0585; H01M 50/184; H01M 50/578; H01M 50/107; H01M 50/202; H01M 50/367; H01M 2200/20; H01M 2220/30
See application file for complete search history.

(56) References Cited

U.S. PATENT DOCUMENTS

| | | | |
|---|---|---|---|
| 2013/0216881 A1* | 8/2013 | Gaugler | H01M 10/4235 429/162 |
| 2021/0111454 A1* | 4/2021 | Zhu | H01M 50/109 |

FOREIGN PATENT DOCUMENTS

| | | | |
|---|---|---|---|
| CN | 109004261 A | | 12/2018 |
| CN | 109216596 A | * | 1/2019 |
| CN | 109216596 A | | 1/2019 |
| CN | 109786611 A | | 5/2019 |

* cited by examiner

BATTERY APPARATUS AND ELECTRONIC DEVICE

CROSS REFERENCE TO RELATED APPLICATIONS

This application is a National Stage of International Application No. PCT/CN2019/095497, filed on Jul. 10, 2019, which claims priority to Chinese Patent Application No. 201910107887.7, filed on Feb. 2, 2019, and Chinese Patent Application No. 201920187952.7, filed on Feb. 2, 2019; all of which are hereby incorporated by reference in their entireties.

TECHNICAL FIELD

The present invention relates to the technical field of energy storage apparatuses, and more particularly, to a battery apparatus and an electronic device.

BACKGROUND

Batteries are usually required for supplying power in electronic products. Typically, a conventional battery is integrally sealed, with various parts of its shell have similar structural strength, in order to achieve water proof and dust proof. However, due to defects in the design or manufacture, batteries are prone to catch fire or even explode during abnormal use or overcharging. In order to ensure safety of the battery, the shell is required to be able to have its tightness broken so as to release pressure punctually when its internal pressure is excessively high.

Chinese patent application CN103262292A provides a solution, wherein a button battery includes two half shells and a sealing piece. The two half shells are connected with each other by press fitting. The sealing piece is located between the two half shells. The two half shells may also be connected with each other in such a manner that the two half shells are interlocked along an axial direction. The two half shells have double-wall regions overlapping with each other along the axial direction. Under the action of internal pressure of the shell, the two half shells move oppositely along the axial direction, so that width of the double-wall regions is reduced. A hole is formed in the half shell on the outer side. When the hole is in communication with an inner cavity, pressure is released through this hole.

However, an axial distance of the button battery is typically fixed during mounting, which makes axial movement of the two half shells difficult. Accordingly, pressure relief is prone to fail, the battery needs a large displacement to faun protection, with a slow protection reaction speed and more accumulated energy. Therefore, there is a need to provide a new technical solution to solve the above technical problem.

SUMMARY

One object of the present invention is to provide a novel technical solution of a battery apparatus.

According to a first aspect of the present invention, a battery apparatus is provided. The battery apparatus includes: a first shell, the first shell includes a first tubular side wall and a top cap arranged at one end of the first tubular side wall; and a second shell, the second shell includes a second tubular side wall and a bottom cap arranged at one end of the second tubular side wall, wherein a recessed structure is formed in at least part of a connection region between the second tubular side wall and the bottom cap; the first shell and the second shell are plugged together in such a way that their respective open ends are opposite to each other; the first tubular side wall sleeves the second tubular side wall; an insulation sealing piece is arranged between the first tubular side wall and the second tubular side wall; a portion of the first tubular side wall close to its open end is bent towards the recessed structure along part of a circumference of the open end to form a partial crimped edge; the partial crimped edge is clamped to the recessed structure; and when internal pressure of the battery apparatus reaches a set value, the first shell partially deforms, so that a sealing structure between the first shell and the second shell is broken, thereby releasing pressure.

Optionally, an explosion-proof groove is formed in the bottom cap and/or the top cap.

Optionally, a pressure releasing hole is formed in the bottom cap and/or the top cap; a sealing cap is arranged on the pressure releasing hole; and the sealing cap has a structural strength lower than a structural strength of the top cap or the bottom cap where the sealing cap is located.

Optionally, an explosion-proof groove is formed in the sealing cap.

Optionally, the explosion-proof groove has a depth equal to 30%-90% of the thickness of a cap in which the explosion-proof groove is formed.

Optionally, the explosion-proof groove has a loop shape or a line shape.

Optionally, the explosion-proof groove takes the shape of a positive sign or a negative sign.

Optionally, there are one or more partial crimped edges.

Optionally, a plurality of notches is formed in a portion of the first tubular side wall close to its open end; a tongue-shaped portion is formed between adjacent notches; and the tongue-shaped portion is bent towards the recessed structure so as to form the partial crimped edge.

According to another embodiment of the present disclosure, an electronic device is provided. The electronic device includes the battery apparatus mentioned above.

According to one embodiment of the present disclosure, in the battery apparatus, the partial crimped edge is arranged at a portion of the first tubular side wall close to its open end along part of a circumference of the open end. This arrangement provides a structure that is relatively unstable, as compared with an arrangement that a crimped edge is formed along the whole circumference of the open end. When an internal pressure of the battery apparatus is increased to the set value, an extruded region of the crimped edge preferentially deforms, and therefore, the first shell and the second shell may deform punctually under a small pressure without a large axial displacement while ensuring sealing performance of the battery apparatus, thereby breaking the sealing structure and relieving the pressure. As such, safety performance of the battery is made more excellent.

In addition, since the first shell and the second shell release pressure through deformation of the first shell, the two shells are not largely separated and less damage would occur to the outside.

Other features and advantages of the present invention will become clear by describing exemplary embodiments of the present invention in detail with reference to the accompanying drawings below.

BRIEF DESCRIPTION OF THE DRAWINGS

The accompanying drawings, which are incorporated in and foi ii a part of the description, illustrate embodiments of the present invention and, together with the description, serve to explain principles of the present invention.

FIG. 1 is a structural diagram of a battery apparatus according to one embodiment of the present disclosure.

Description of reference numerals: 11: first tubular side wall; 12: top cap; 13: bottom cap; 14: explosion-proof groove; 15: pressure releasing hole; 16: sealing cap; 17: insulation loop; 18: notch; 19: tongue-shaped portion; 20: recessed structure; 21: partial crimped edge; 22: second tubular side wall; 23: battery cell; and 24: sealing structure.

DETAILED DESCRIPTION

Various exemplary embodiments of the present invention will now be described in detail with reference to the accompanying drawings. It should be noted that the relative arrangement of the components and steps, numerical expressions, and numerical values set forth in these embodiments do not limit the scope of the present invention unless it is specifically stated otherwise.

The following description of at least one exemplary embodiment is in fact merely illustrative and is in no way intended as a limitation to the present invention and its application or use.

Techniques, methods, and devices known to those of ordinary skill in the relevant art may not be discussed in detail, but should be considered as part of the description where appropriate.

Any specific value in all the examples shown and discussed herein shall be interpreted to be illustrative only, and shall not be interpreted as limitative. As such, other examples of exemplary embodiments may have different values.

It should be noted that like reference numbers and letters are used to depict similar terms in the following figures, and therefore, once an item is defined in a figure, no further discussion on the item is needed in subsequent figures.

Figure 1:
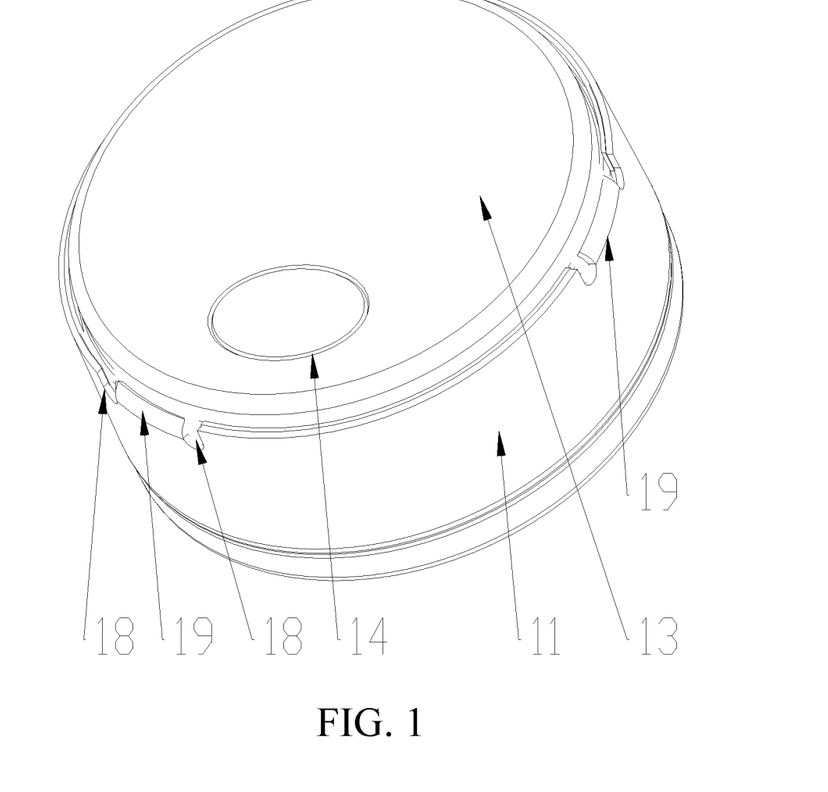
Figure 2:
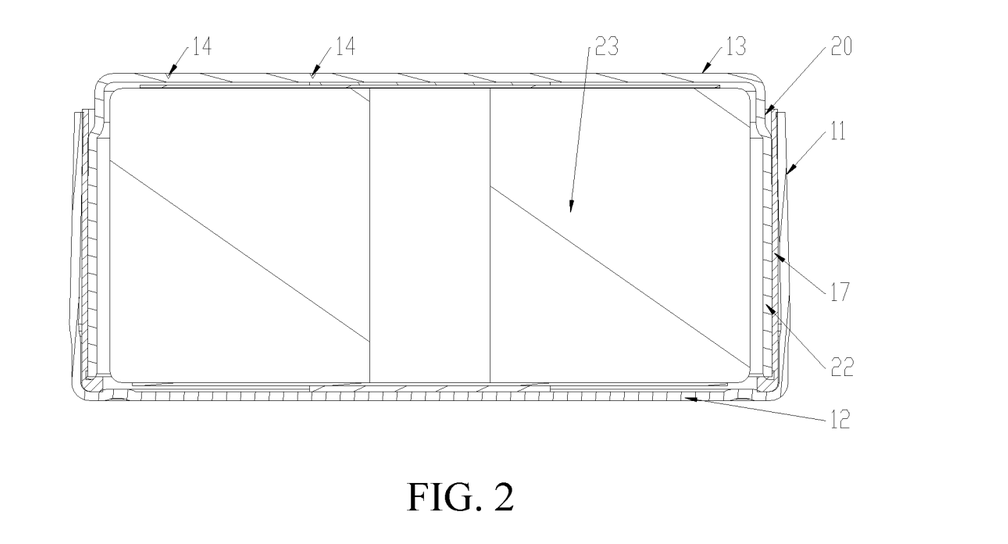
FIG. 2 is a sectional view of a battery apparatus according to one embodiment of the present disclosure.

According to one embodiment of the present disclosure, a battery apparatus is provided. As shown in FIGS. 1 and 2, the battery apparatus is a primary or secondary battery, and includes a first shell and a second shell that are fit together. Both the first shell and the second shell are made of a metal material, such as aluminum alloy, stainless steel or the like. The first shell and the second shell function as two electrodes of the battery apparatus, respectively.

Figure 3:
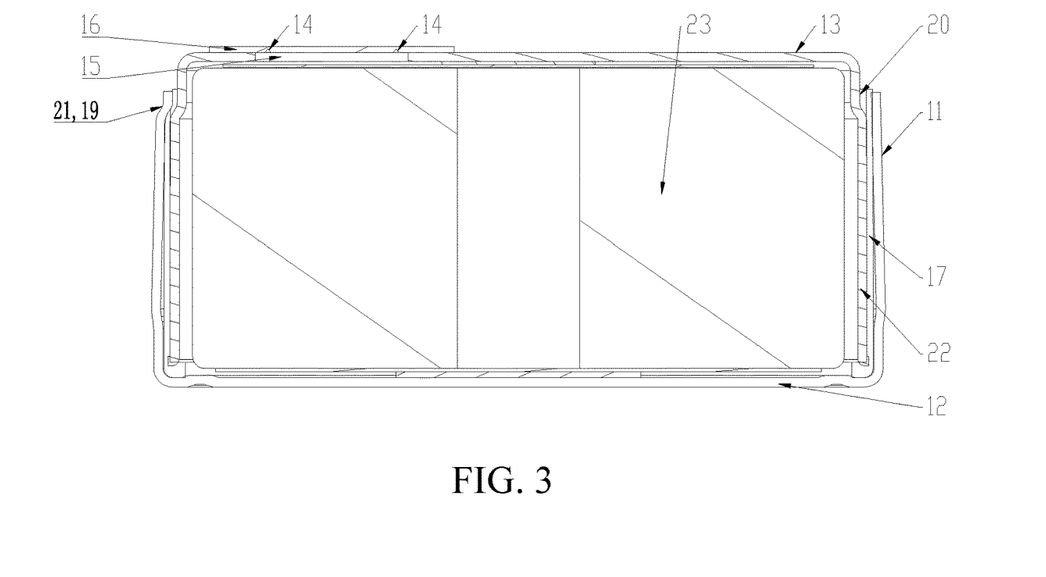
FIG. 3 is a sectional view of a battery apparatus of a second type according to one embodiment of the present disclosure.

As shown in FIGS. 1-3, the first shell includes a first tubular side wall 11 and a top cap 12 arranged at one end of the first tubular side wall 11. The one end of the first tubular side wall 11 which faces the top cap 12 is an open end. The second shell includes a second tubular side wall 22 and a bottom cap 13 arranged at one end of the second tubular side wall 22. The one end of the second tubular side wall 22 which faces the bottom cap 13 is an open end.

Figure 5:
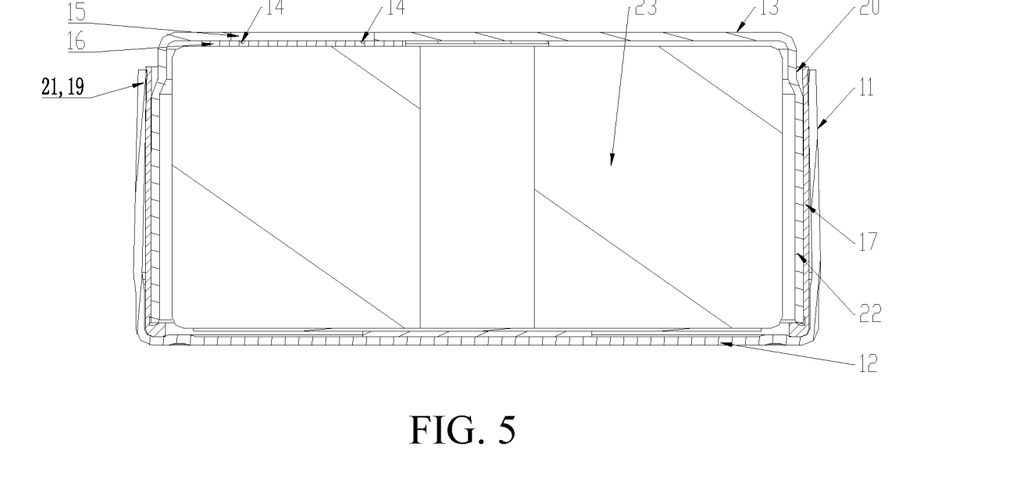
FIG. 5 is a sectional view of a battery apparatus of a third type according to one embodiment of the present disclosure.

As shown in FIGS. 2, 3 and 5, a recessed structure 20 is formed in at least part of a connection region between the second tubular side wall 22 and the bottom cap 13. The connection region is located near a corner. Of course, for easy arrangement, the connection region may have a set distance from the corner, but can also be directly formed in the corner. The recessed structure 20 is a loop-shaped groove or a discontinuous groove, arranged around the bottom cap 13.

The first shell and the second shell are plugged together in such a way that their respective open ends are opposite to each other. The first tubular side wall 11 sleeves the second tubular side wall 22. An insulation sealing piece is arranged between the first tubular side wall 11 and the second tubular side wall 22. An inner diameter of the first tubular side wall 11, e.g., is greater than an outer diameter of the second tubular side wall 22. The insulation sealing piece is an insulation loop 17 made of a plastic or rubber material, which material features excellent insulation and sealing effect.

Figure 7:
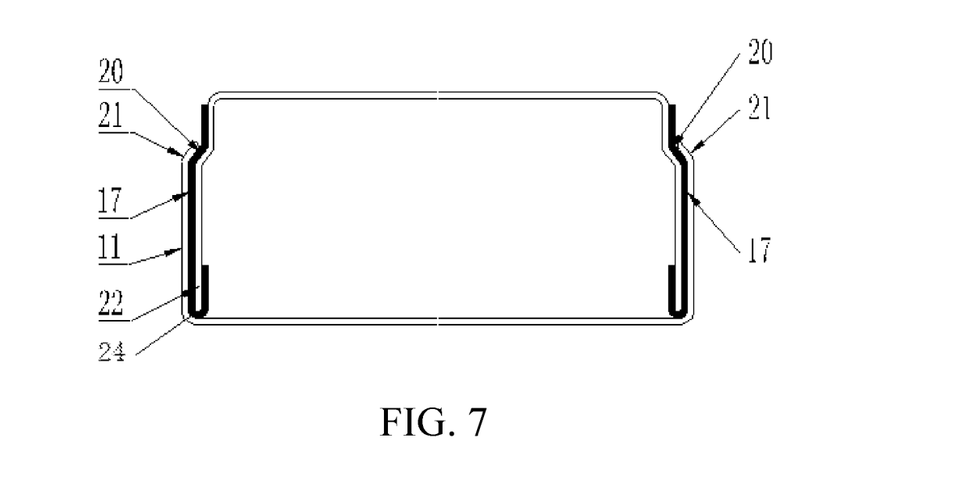
FIGS. 7-10 are schematic views showing a pressure relief principle of a battery apparatus according to one embodiment of the present disclosure.
Figure 8:
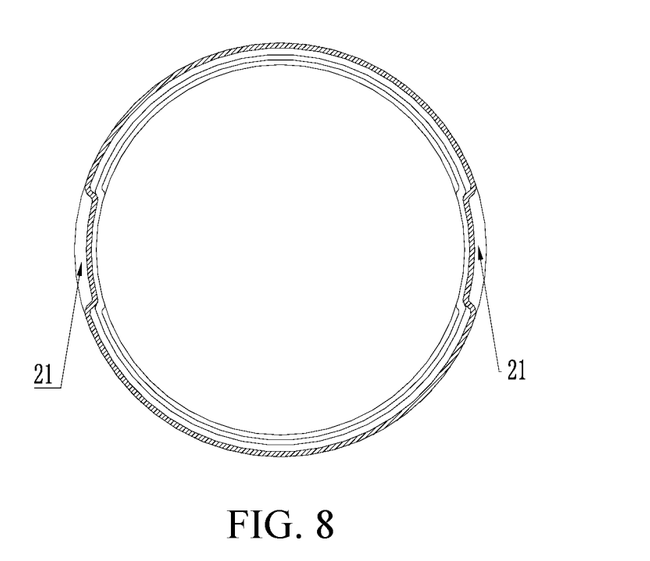

For example, as shown in FIG. 7, the insulation loop 17 forms a U-shaped portion at a position where a sealing structure 24 locates. The U-shaped portion wraps the open end of the second shell. The U-shaped portion features larger contact area between its (inner and outer) surfaces and the two shells, respectively, thereby significantly improving the sealing effect of the sealing structure. The sealing structure 24 refers to a sealing structure formed between the open end of the second shell and the top cap 12 of the first shell.

Before assembly, at first, a battery cell 23 is placed in the second shell, and the insulation loop 17 sleeves the second tubular side wall 22. The battery cell 23 may be, but is not limited to, a lithium ion battery cell 23, a lithium metal battery cell 23, etc. Then, open ends of the two shells are opposite to each other, and the second tubular side wall 22 is plugged into the first tubular side wall 11. A hermetic cavity is formed inside the first shell and the second shell. The first tubular side wall 11 is extruded towards the second tubular side wall 22 so as to achieve better sealing.

As shown in FIGS. 3, 4 and 6-10, a portion of the first tubular side wall 11 close to its open end is bent towards the recessed structure 20 along part of a circumference of the open end, so as to form a partial crimped edge 21. The partial crimped edge 21 is clamped to the recessed structure 20. The partial crimped edge tends to deform when partially pressurized, and the first shell partially deforms when internal pressure of the battery apparatus reaches a set value, so that the sealing structure between the first shell and the second shell is broken, thereby releasing pressure.

For example, the first shell partially deforms along a radial direction. The radial direction is indicated by an arrow in FIG. 10. For example, when pressure in the cavity reaches 2 MPa, the partial crimped edge 21 moves away from the recessed structure 20 along the radial direction, and is finally detached from the recessed structure, so that the sealing structure 24 between the first shell and the second shell is broken, thereby releasing pressure.

Figure 9:
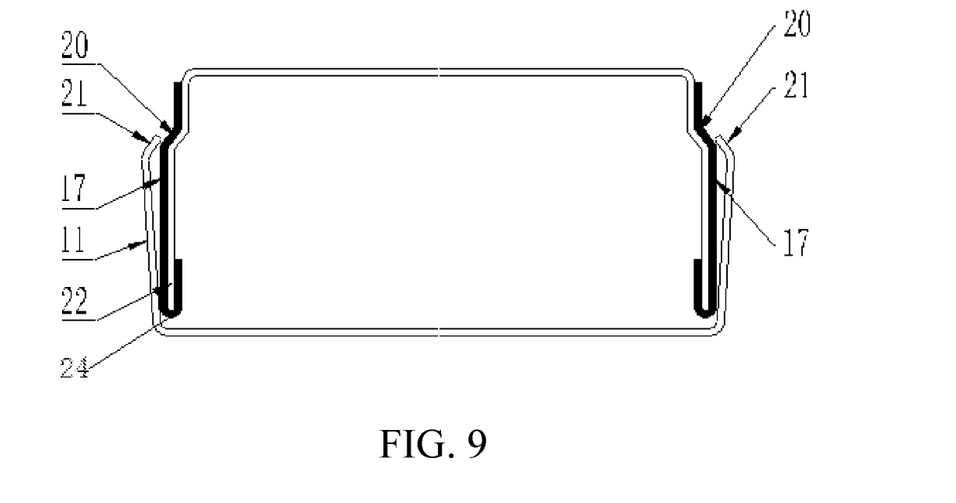

As shown in FIG. 9, when the pressure in the cavity reaches 2 MPa, the second tubular side wall 22 maintains its original shape. Since the partial crimped edge 21 is detached from the recessed structure 20, the open end of the first tubular side wall 11 deforms. Deforming of the open end of the first tubular side wall 11 causes deforming of a portion close to the top cap 12, thereby breaking the sealing structure 24 and forming a break. Gas inside escapes from the break.

Figure 10:
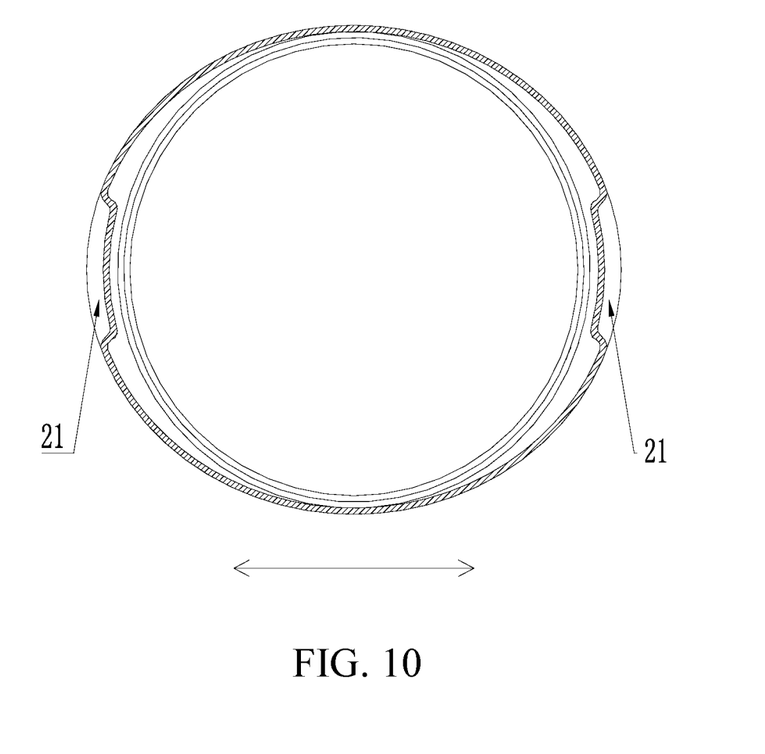

For example, as shown in FIGS. 9 and 10, the first shell deforms due to internal pressure, and its cross section changes from a circular one to a spindle shape, an elliptical shape or the like. The two partial crimped edges 21 move away from each other and are finally detached from the recessed structure 20, while breaking the sealing structure at the bottom of the first shell.

Of course, the number of the partial crimped edges 21 is not limited to 2 or 3, and may be set by those skilled in the art according to actual needs.

In this example, the partial crimped edge 21 is arranged at a portion of the first tubular side wall close to its open end along part of a circumference of the open end. This arrangement provides a structure that is relatively unstable, as compared with an arrangement that a crimped edge is formed along the whole circumference of the open end. When an internal pressure of the battery apparatus is increased to the set value, an extruded region of the crimped edge preferentially deforms, and therefore, the first shell and the second shell may deform punctually under a small pressure without a large axial displacement while ensuring sealing performance of the battery apparatus, thereby breaking the sealing structure and relieving the pressure. As such, safety performance of the battery is made more excellent.

In addition, since the battery apparatus releases pressure through the deformation of the first shell, the two shells are not largely separated and less damage would occur to the outside.

In addition, the partial roller edge 21 is separated from the recessed structure 20 at least along the radial direction, and accordingly, separation in this way can release pressure more quickly with less accumulated energy, improving safety.

Figure 4:
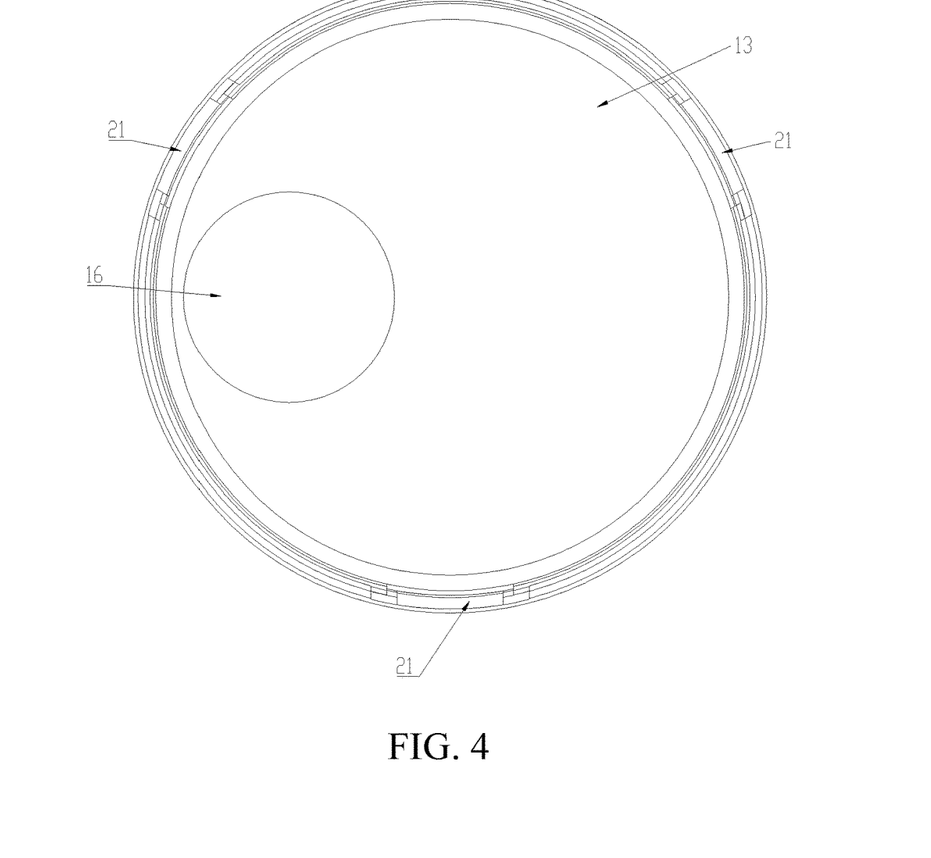
FIG. 4 is a top view of a battery apparatus of a second type according to one embodiment of the present disclosure.
Figure 6:
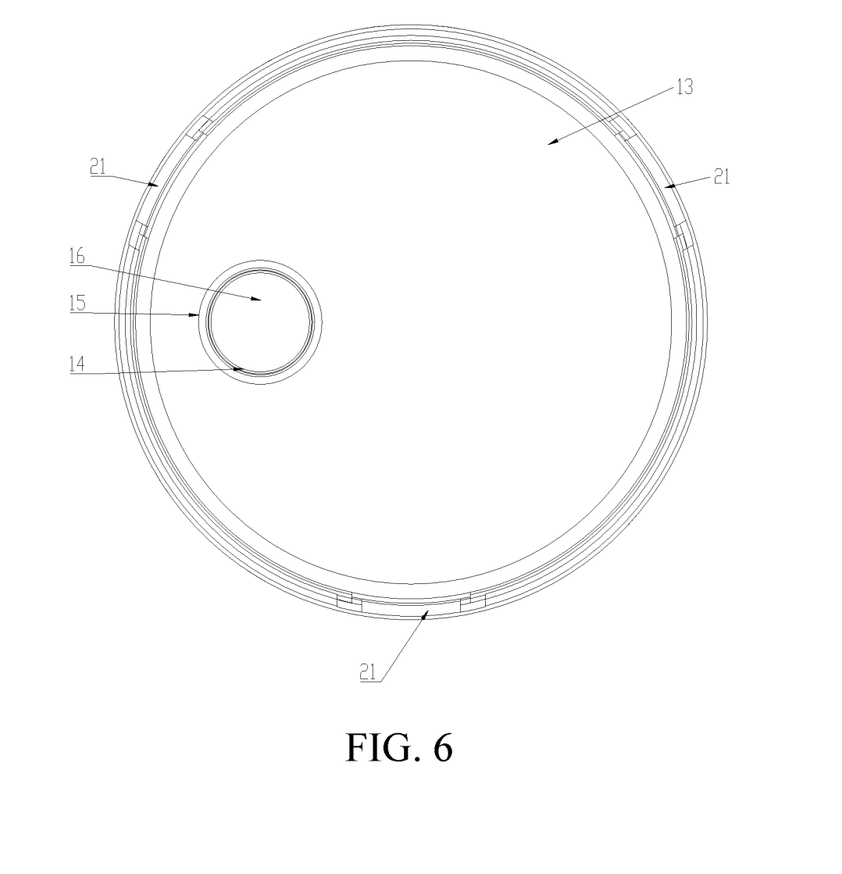
FIG. 6 is a top view of a battery apparatus of a third type according to one embodiment of the present disclosure.

In one example, as shown in FIGS. 1, 4 and 6, there is a plurality of (such as 3) partial crimped edges 21. For example, the plurality of partial crimped edges 21 is distributed with respect to the open end of the first shell. In this example, the plurality of partial crimped edges 21 enables the first shell and the second shell to have the same explosive-proof grade at all positions, thus ensuring better reliability and stability of the battery apparatus.

For example, the partial crimped edges 21 are uniformly distributed with respect to the open end of the first shell. As such, the first shell and the second shell are fixed more uniformly along the circumference of the open end, with higher explosive-proof grade.

Of course, the plurality of partial crimped edges 21 may also be non-uniformly distributed with respect to the open end of the first shell.

In other examples, there may also be provided only one partial crimped edge 21. This arrangement also features excellent pressure-relief and explosion-proof effect. Sealing between the first and the second shell is achieved by tight press-fit between the first tubular side wall 11, the insulation loop 17, and the second tubular side wall 22.

There is a plurality of arrangements for the partial crimped edge 21. In one example, as shown in FIG. 1, a plurality of notches 18 is formed into a portion of the first tubular side wall 11 close to its open end. The notches 18 may be formed through e.g., laser etching, plasma cutting, punching or the like. A tongue-shaped portion 19 is formed between adjacent notches 18. A left side and a right side of the tongue-shaped portion 19 are separated from other portions of the first tubular side wall 11. The tongue-shaped portion 19 is bent towards the recessed structure 20 so as to form the partial crimped edge 21. For example, the tongue-shaped portion 19 is extruded towards the recessed structure 20 by punching, so that the tongue-shaped 19 is fitted onto the recessed structure 20 and thus clamped to the recessed structure 20.

The tongue-shaped portion 19 is in point contact with the recessed structure 20. Alternatively, the tongue-shaped portion 19 has an arc, and is in arc surface contact with the recessed structure 20.

In this example, the tongue-shaped portion 19 is more firmly clamped to the recessed structure 20. The sealing effect between the first shell and the second shell is better.

In addition, bending of the tongue-shaped portion 19 does not affect other portions of the first tubular side wall 11. Therefore, the overall structure of the battery apparatus is kept.

In another example, the portion of the first tubular side wall 11 close to its open end is bent towards the recessed structure 20 to form the partial crimped edges 21, and there is no need for the notches 18.

The shell may be made of metal, for example. The portion of the open end of the first shell is partially punched inwards by punching or rolling, so as to form the partial crimped edges 21. As such, clamping may also be formed.

In one example, as shown in FIGS. 1 and 2, an explosion-proof groove 14 is formed in the bottom cap 13 and/or the top cap 12. When pressure in the battery apparatus reaches a set value, the explosion-proof groove 14 is broken, thereby releasing pressure. A cross section of the explosion-proof groove 14 may be e.g., U-shaped, V-shaped or the like. The explosion-proof groove 14 is formed through laser etching or chemical etching. The explosion-proof groove 14 is formed on an inner or outer surface of the top cap 12 and/or the bottom cap 13. The abovementioned shape results in stress concentration at the bottom of the explosion-proof groove 14, and the explosion-proof groove 14 is easily broken with highly sensitivity.

The explosion-proof groove 14 may have e.g., a loop shape or a line shape. The loop shape may include e.g., a rectangular loop shape, a circular loop shape, an elliptical loop shape, and the like. The loop-shaped explosion-proof groove 14 is more easily broken and forms a through hole after being broken. Comparing with a cleft, a through hole releases pressure more quickly and features better explosion-proof performance. The line shape may include e.g., a rectilinear line, an arc, a wavy line, and the like. All of the above shapes have good pressure relief and explosion-proof effects.

In one example, the explosion-proof groove 14 takes the shape of a positive sign or a negative sign. The top cap 12, for example, generally functions as a positive electrode of the battery apparatus. A positive electrode collector of the battery cell 23 is electrically connected with the top cap 12. A "+" shaped explosion-proof groove 14 is formed in the outer surface of the top cap 12 (e.g., in the central portion of the top cap 12). The bottom cap 13 is usually used as a negative electrode of the battery apparatus. A negative electrode collector of the battery cell 23 is electrically connected with the bottom cap 13. A "−" shaped explosion-proof groove 14 is formed in the outer surface of the bottom cap 13 (e.g., in the central portion of the bottom cap 13). In this example, the explosion-proof groove 14 functions not only to release the pressure and prevent explosion, but also to identify the positive electrode and the negative electrode.

In some battery apparatuses, in order to ensure structural strength, the first shell and the second shell are thick, and do not deform easily. An explosion-proof groove 14 formed in this way has low sensitivity, and cannot release pressure under relatively low pressure (for example, 2 MPa).

In order to solve this technical problem, in one example, as shown in FIGS. 3-6, a pressure releasing hole 15 is formed in the bottom cap 13 and/or the top cap 12. The pressure releasing hole 15 is used for enabling gas in the battery apparatus to flow out so as to release pressure. Normally, the pressure releasing hole 15 is sealed. For example, a sealing cap 16 is arranged on the pressure releasing hole 15. The sealing cap 16 has a structural strength lower than a structural strength of the top cap 12 or the bottom cap 13 where the sealing cap 16 is located. In this example, since the structural strength of the sealing cap 16 is relatively low, the sealing cap can be broken under the relatively low pressure so as to release pressure.

Further, as shown in FIGS. 3, 5 and 6, an explosion-proof groove 14 is formed in the sealing cap 16. The shape of the explosion-proof 14 is as described above.

In this example, since the structural strength of the sealing cap 16 is lower than the structural strength of the top cap 12 or the bottom cap 13 where the sealing cap 16 is located, the explosion-proof 14 may be broken under relatively low pressure. By this means, the explosion-proof groove 14 has higher sensitivity.

For example, the sealing cap 16 is made of a metal, such as copper alloy, aluminum alloy, stainless steel, etc. The sealing cap is arranged on the pressure releasing hole 15 by laser welding or resistance welding to faun sealing.

The material of the sealing cap 16 is for example the same as that of the top cap 12 or the bottom cap 13 where the sealing cap 16 is located. The thickness of the sealing cap 16 is smaller than the thickness of the top cap 12 or the bottom cap 13 where the sealing cap 16 is located. Alternatively, the sealing cap 16 may be made of metal with a lower structural strength. For example, the top cap 12 or the bottom cap 13 is made of stainless steel, while the sealing cap 16 is made of copper, aluminum or the like.

In one example, the explosion-proof groove has a depth equal to 30%-90% of the thickness of a cap in which the explosion-proof groove is formed. The cap includes the top cap 12, the bottom cap 13 or the sealing cap 16. In this depth range, the battery apparatus has excellent sealing performance and safety performance.

In the above embodiment, the clamping of the partial crimped edge 21 and the recessed structure 20, as well as the sealing cap 16 and the explosion-proof groove 14, together form a multi-level safety measure. As such, when the pressure in the battery apparatus reaches the set value, at least one level of the safety measure can function to release the pressure. With such an arrangement, safety performance of the battery apparatus is significantly improved.

According to another embodiment of the present disclosure, an electronic device is provided. The electronic device may be, but is not limited to a mobile phone, a tablet computer, a smart watch, a laptop computer, a game machine, an interphone, a headphone, an e-book reader, or the like.

The electronic device includes a housing in addition to the battery apparatus mentioned above. A PCB is arranged in the housing. The battery apparatus is arranged in the housing and is electrically connected with a power utilization device in the electronic device through the PCB.

The electronic device is characterized in excellent safety performance.

While some specific embodiments of the present invention have been illustrated by way of example, it will be understood by those skilled in the art that the foregoing examples are provided for the purpose of illustration and are not intended to limit the scope of the present invention. It will be understood by those skilled in the art that the foregoing embodiments may be modified without departing from the scope and spirit of the present invention. The scope of the present invention is subject to the attached claims.

The invention claimed is:

1. A battery apparatus, comprising: a first shell, comprising a first tubular side wall and a top cap arranged at one end of the first tubular side wall; and a second shell, comprising a second tubular side wall and a bottom cap arranged at one end of the second tubular side wall, a recessed structure being formed in at least apart of a connection region between the second tubular side wall and the bottom cap; the first shell and the second shell being plugged together in such a way that their respective open ends are opposite to each other, wherein the first tubular side wall sleeves the second tubular side wall; an insulation sealing piece being arranged between the first tubular side wall and the second tubular side wall; a portion of the first tubular side wall close to the open end of the first shell comprising more than one first edges, wherein each of the more than one first edges comprises a tongue-shaped portion formed between a pair of adjacent notches; a part of the tongue-shaped portion is bent towards the recessed structure along the circumference of the open end of the first shell so as to form a partial crimped edge, the partial crimped edge being clamped to the recessed structure; when internal pressure of the battery apparatus reaches a set value, the first shell partially deforms, so that a sealing structure between the first shell and the second shell is broken, thereby releasing pressure, and wherein the portion of the first tubular side wall close to the open end of the first shell further comprises more than one second edges, wherein said more than one second edges are not bent towards the recessed structure, and said tongue-shaped portion and said more than one second edges are provided alternately along the portion of the first tubular side wall close to the open end of the first shell.

2. The battery apparatus according to claim 1, further comprising an explosion-proof groove that is formed on an outer surface of the bottom cap and/or the top cap.

3. The battery apparatus according to claim 2, further comprising:
   a sealing cap that is arranged on an inner surface of the bottom cap and/or the top cap; and
   a pressure releasing hole that is a through hole formed in the bottom cap and/or the top cap,
wherein the sealing cap covers the pressure releasing hole, and the sealing cap has a structural strength lower than a structural strength of the top cap or the bottom cap where the sealing cap is located.

4. The battery apparatus according to claim 3, wherein an additional explosion-proof groove is formed in the sealing cap.

5. The battery apparatus according to claim 3, wherein the explosion-proof groove has a depth equal to 30%-90% of the thickness of the top cap or bottom cap in which the explosion-proof groove is formed.

6. The battery apparatus according to claim 3, wherein the explosion-proof groove has a loop shape or a line shape.

7. An electronic device, comprising the battery apparatus according to claim 1.

8. The battery apparatus according to claim 2, wherein the explosion-proof groove has a depth equal to 30%-90% of the thickness of the top cap or bottom cap in which the explosion-proof groove is formed.

9. The battery apparatus according to claim 2, wherein the explosion-proof groove has a loop shape or a line shape.

* * * * *